United States Patent

[11] 3,553,498

[72] Inventor Toshiyuki Yamada
Yokohama-shi, Japan
[21] Appl. No. 704,825
[22] Filed Feb. 12, 1968
[45] Patented Jan. 5, 1971
[73] Assignee Sony Corporation
Tokyo, Japan
a corporation of Japan
[32] Priority Feb. 20, 1967
[33] Japan
[31] No. 42/10774
Continuation-in-part of application Ser. No. 673,658, Oct. 9, 1967, now Patent No. 3,519,899.

[54] MAGNETORESISTANCE ELEMENT
9 Claims, 7 Drawing Figs.

[52] U.S. Cl. .......... 307/299, 307/304; 317/235; 324/46; 307/309
[51] Int. Cl. .......... H01l 11/00
[50] Field of Search .......... 317/235, 23, 43, 21.1; 307/309; 324/46

[56] References Cited
UNITED STATES PATENTS

| | | | |
|---|---|---|---|
| 2,900,531 | 8/1959 | Wallmark | 317/235 |
| 3,158,754 | 11/1964 | Yu | 317/235 |
| 3,339,086 | 8/1967 | Shockley | 317/235 |

*Primary Examiner*—Jerry D. Craig
*Attorney*—Hill, Sherman, Meroni, Gross & Simpson

ABSTRACT: A magnetoresistance element with a control electrode which allows a control voltage to vary the electrical characteristics is disclosed. A semiconductor material of intrinsic property is provided with p- and n-regions spaced from each other and a control electrode is attached to the area between the p- and n-regions and an electric field is applied to vary the electrical characteristics. A magnetic field may also be applied to control the response of the element or alternatively the device may be utilized to detect the strength and direction of a magnetic field.

PATENTED JAN 5 1971 3,553,498

INVENTOR.
Toshiyuki Yamada

BY Hill, Sherman, Meroni, Gross & Simpson ATTORNEYS

MAGNETORESISTANCE ELEMENT

CROSS REFERENCE TO RELATED APPLICATIONS

This application is a continuation-in-part of my prior Pat. application Ser. No. 673,658, filed on Oct. 9, 1967, now U.S. Pat. No. 3,519,899 entitled "Magnetoresistance Element."

BACKGROUND OF THE INVENTION

Field of the Invention

This invention relates to a magnetoresistance element and particularly to a magnetoresistance element with an electrode to which a controlling voltage is applied to vary the electrical characteristics of the magnetoresistance element.

SUMMARY OF THE INVENTION

My copending application Ser. No. 673,658, filed Oct. 9, 1967 entitled "Magnetoresistance Element," of which this application is a continuation-in-part, discloses an element of intrinsic semiconductor material with *p* and *n* regions formed in the intrinsic semiconductor material and with one or more recombination zones between the *p* and *n* regions. A magnetic field varies the electrical characteristics of the device and a field may be applied to control the response or the device may be used to detect the presence of a magnetic field.

In this invention, carriers are ejected into a semiconductor material of intrinsic characteristic with *n* and *p* regions and are deflected toward or away from the surface of said semiconductor substance by means of a magnetic field which causes variations in the electrical characteristics. In addition, the surface recombination velocity in the semiconductor is controlled by an electric field applied to an electrode adjacent the intrinsic region of the semiconductor. For this purpose, a control electrode is provided which applies an electric field to the semiconductor. Various combinations to control the output are available by varying the magnetic and electric fields. The device may also be used as a detector of magnetic fields.

Accordingly, it is an object of this invention to provide a magnetoresistance element in which the electrical characteristics can be varied with a voltage applied to a control electrode.

Another object of this invention is to provide a magnetoresistance element in which the magnetic response can be varied with a voltage applied to a control electrode.

Still another object of this invention is to provide a magnetoresistance element in which the electrical and magnetic fields may be varied to change the characteristics.

Other objects, features and advantages of this invention will become apparent from the following description and claims taken in conjunction with the accompanying sheet of drawings.

DESCRIPTION OF THE PREFERRED EMBODIMENTS

Figure 1:
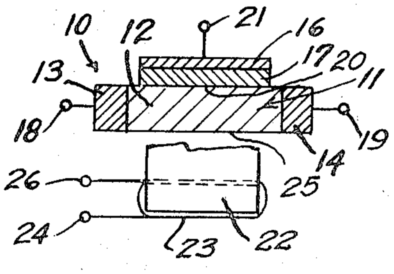
FIG. 1 is a sectional view of one example of a magnetoresistance element according to this invention.

FIG. 1 illustrates a magnetoresistive element 10 of this invention which comprises a crystal 11 of intrinsic semiconductor material 12.

The word "intrinsic" in this specification implies that the electrons and holes, in the thermal equilibrium, have respective concentration of the same order of magnitude; that is, the concentration of electrons is at most about 10 times the concentration of the holes, or vice versa. However, the concentrations of the electrons and holes are desirable to be substantially the same order for obtaining the best characteristics.

The crystal 12 might be formed of germanium, silicon, or other suitable material into which carriers or holes and electrons can be sufficiently injected and which is intrinsic at room temperature. At one end of the crystal a *p*-type region 13 is formed and at another portion an *n*-type region 14 is formed. The *p* and *n*-type regions 13 and 14 may be formed by means of alloying, diffusion, epitaxial growth method or in any well know manner. If the semiconductor material 12 is germanium, for instance, the *p*-type region 13 can be formed on one end of the germanium crystal by alloying In-Ga alloy therewith, and the *n*-type region 14 can be formed on the other end of the crystal by alloying Sn-Sb alloy therewith. The *p* and *n* regions 13 and 14 need not be formed on opposite ends of the crystal as shown in FIG. 1, but the distance between them must be greater than the sum of the diffusion distances of the carriers measured from the *n* and *p*-type regions respectively.

On the surface of the intrinsic region 12 between the *p* and *n*-type regions 13 and 14, a field effect electrode 16 is formed. The field effect electrode might be made, for example, of a suitable metal as for example, nickel and is insulated from the crystal 12 by an insulating layer 17. The layer 17 might be a suitable plastic such as polyethylene, or an oxide layer such as silicon dioxide, or a nitrate layer. Leads 18 and 19 are connected to the *p* and *n*-type regions 13 and 14, respectively, and a lead 21 is connected to the field effect electrode 16. A magnetic field producing means 22, as for example, an electromagnet has a winding 23 which has input leads 24 and 26. The magnet 22 is capable of producing a magnetic field through the semiconductor material 12 which is normal to the plane of the drawing of FIG. 1.

Figure 2:
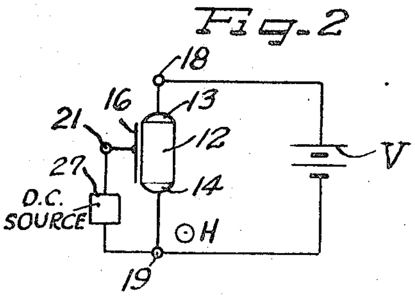
FIG. 2 is a circuit diagram of a magnetoresistance element according to FIG. 1.

FIG. 2 illustrates the magnetoresistance element of FIG. 1 connected in circuit. A battery V has its positive terminal connected to lead 18 which is connected to the *p*-type region 13. The negative terminal of the battery V is connected to the *n*-type region 14. A DC source 27 is connected between leads 19 and 21. The voltage source V causes holes to be injected into the intrinsic region 12 from the *p*-type region 13 and electrons to be injected from the *n*-type region 14 into the intrinsic region 12. This causes a change in the conductivity between leads 18 and 19 and results in a current of great intensity.

Under these conditions the DC source 27 provides an electric field between the electrode 21 and the intrinsic region 12 of the semiconductor substance and the surface recombination velocity of the carriers or electrons and holes of the surface section adjacent the electrode 16 can be substantially enhanced as compared with other sections of the surface 20. The surface recombination velocity of a semiconductor substance varies as a function of an electric field applied to the surface 20 of the semiconductor substance. The polarity of the electric potential to be applied to the electrode 16 in order to enhance the surface recombination will depend upon whether the *p*-type region is superior to the *n*-type region on the surface 20 of the semiconductor material. For example, if the surface 20 of the semiconductor 12 is a *p*-type, the surface recombination velocity will be enhanced upon application of a positive voltage to the electrode 16, whereas on the other hand, if the surface 20 is of *n*-type, the surface recombination velocity will be increased upon application of a negative voltage to the electrode 16. The conductive type of the surface of the semiconductor substance will be determined by surface treatments and atmospheric conditions. For example, by dipping the semiconductor materials 12 in a hydrogen peroxide solution, the surface will be of *p*-type, whereas soaking it in hydrofluoric acid will result in a surface 20 of *n*-type. The electric field required to cause this phenomena is generally in the order of $10^5$–$10^6$ V/cm. When the thickness of the insulating layer 17 is approximately 5 microns, the voltage applied to the electrode 16 will be in the range of 5–50 volts, and when the insulating layer 17 is approximately 1 micron thick, the voltage applied will vary from 1–10 volts.

Figure 3:
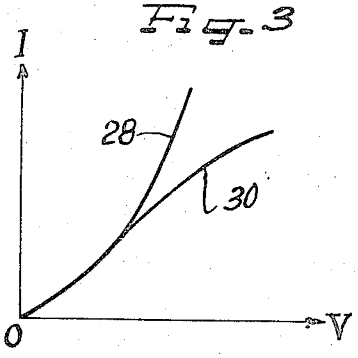
FIGS. 3 and 4 are graphs showing the voltage current characteristics of the magnetoresistance element of FIG. 1.

FIG. 3 is a plot of current vs. voltage between the terminals 18 and 19 of the semiconductor device 10. If no magnetic field is being applied by magnet 22 to the device, the curve 28 will result. If a magnetic field H is applied to the semiconductor device 10 in a direction at right angles to the direction of the current flowing in the region of the intrinsic material 12 between *p* and *n*-type regions 13 and 14, electrons and holes will be deflected in a common direction. In this case, if the magnetic field H is selected so that the direction which electrons and holes are deflected by the magnetic field is towards the surface 20 adjacent the field effect electrode 16, such electrons and holes will be subject to the electric field and will quickly recombine in section 20 of the surface where the surface recombination velocity has been enhanced thereby reducing the current through the device.

Thus, if the current is reduced with the surface recombination velocity increased by the magnetic field H, the resistance of the region will increase and the voltage supplied to the section formed between the *p* and *n*-type regions 13 and 14 and the intrinsic region will be relatively decreased reducing the efficiency of injection and thereby increasing the effective resistance of the region 12. Thus, the magnetoresistive element 10 exhibits a positive feedback effect by which its sensitivity can be increased. In other words, when the magnetic field H is as described above, the electric current I will decrease as indicated by the curve 30 in FIG. 3.

When a Hall voltage is produced by the magnetic field H, it produces a force which acts in a direction opposite to that of the carriers towards the field effect electrode 16 and lowers the sensitivity. Consequently it is desirable to prevent the Hall effect as much as possible. It has been found that if the relation $\frac{n+p}{n-p} >> 1$ is maintained, the Hall effect will be minimized. (*n* and *p* represent the number of electrons and holes per unit volume, respectively, in the intrinsic material 12).

If it is assumed that the number of electrons and holes per unit volume represent *n* and *p*respectively, and the number of electrons and holes per unit volume which have been rejected in the region 12 from *n*- and *p*-type regions 13 and 14 equal *n'* and *p'* respectively, and are selected for example as follows:

$$n_o = 1 \times 10^{13}\text{cm.}^{-3}$$
$$p_o = 0.9 \times 10^{13}\text{cm.}^{-3}$$
$$n' = p' = 10 \times 10^{13}\text{cm.}^{-3}$$

then $$n = n' + n_o = 11 \times 10^{13}$$
$$p = p' + p_o = 10.9 \times 10^{13}$$

Therefore, it follows that $$\frac{n+p}{n-p} = \frac{21.9 \times 10^{13}}{0.1 \times 10^{13}} = 219$$

If, however, the *n* and *p*-type regions 13 and 14 are not present and neither electrons nor holes are injected into the region 12 from the regions 13 and 14, $$n = n_o$$
$$p = p_o$$

and accordingly it follows that $$\frac{n+p}{n-p} = \frac{n_o + p_o}{n_o p_o} = \frac{1.9}{0.1} = 19$$

Hence, injection of holes and electrons into the region 12 by providing *p* and *n*-type regions 13 and 14 according to this invention, will reduce the effect of the Hall voltage and this is an additional feature of this invention. This invention is characterized in that the *p* and *n*-type regions 13 and 14 are provided and holes and electrons are injected into the region 12 from these regions. This invention is very significant in practice in that even if a nonintrinsic semiconductor substance is employed under a thermal equilibrium condition, a great effect can be obtained by making sufficient injection of electrons and holes. For example, when using silicon, it is usually difficult to obtain an intrinsic semiconductor substance at ordinary room temperature, but this invention allows the injection of holes and electrons which will result in the relationship $n \approx p$ or $n \doteqdot p$ to obtain the advantages listed above.

If the magnetic field H is applied by magnet 22 in a direction opposite to the direction assumed above, the carriers will be directed toward the side 25 opposite from the field effect electrode 16 and the current path as a whole goes away from the region where the recombination velocity is large so that the extinction of the carriers in the region 12 can be reduced. This will prolong the mean life of the carriers and, as a result, the current increases, thereby causing magnetic resistance.

Since the electric characteristics of magnetoresistance element 12 are changed by applying a magnetic field, it may be used to measure the presence of intensity of a magnetic field. In addition, the device can be used for other purposes such as a switch actuated by a magnetic field.

In the semiconductor element 10 constructed as above, the current I varies with the voltage applied to the field effect electrode 16.

Thus, if in FIG. 2 an AC voltage is connected in place of the DC source 27, an AC voltage $U_i$ will be applied to the field effect electrode 16. If no magnetic field is applied, the voltage V vs current I characteristic curve is shown by the curve 31 in FIG. 4 which has a range of current variations $\Delta I_{Ho}$. When a magnetic field H which directs the carriers toward the surface 20 of the region 12 having a field effect electrode 16 is applied, the characteristic curve 32 of FIG. 4 results, which has a range of current variations $\Delta I_H$.

Figure 5:
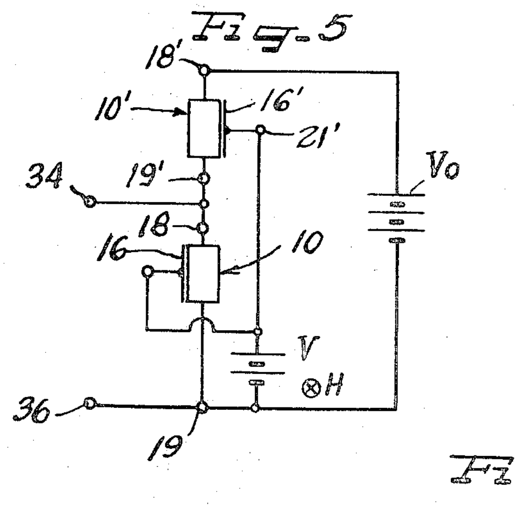
FIG. 5 illustrates a pair of magnetoresistance elements according to FIG. 1 connected in circuit.

To increase the sensitivity, a pair of the elements 10 according to this invention may be used. FIG. 5 shows two semiconductor elements 10 according to this invention, which are connected in series to the DC source $V_o$. Elements 10 and 10' are mounted so that the direction of the carrier effect electrode 16 of one of the elements 10 is on one side and the electrode 16' of the other element is placed on the opposite side from that of electrode 16. The electrodes 16 and 16' are connected to the common bias source V, and output terminals 34 and 36 extend from terminals 19 and 18 across element 10. The magnetic field H is indicated by the circle H adjacent source V.

In the circuit of FIG. 5 the same electric potential is applied to the field effect electrodes 16 and 16'. When the magnetic field is zero, the resistances between the terminals 18 and 19 of the both elements 10 and 10' are almost the same and an output across terminals 34 and 36 will be one-half $V_o$. If a magnetic field H in a direction at a right angle to the surface of the paper relative to FIG. 5 is applied, the output across terminals 34 and 36 will vary because of the resistance variations caused by the magnetic field on elements 10 and 10'.

Figure 4:
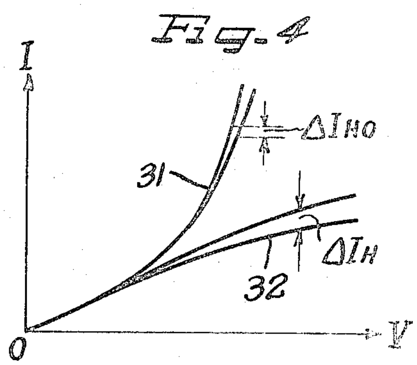

The sensitivity of the element 10 to the magnetic field decreases as the temperature increases which results in a range of variations as shown by the curves 32 in FIG. 4. The electric source V may be varied as temperature changes to temperature compensate the devices.

Figure 6:
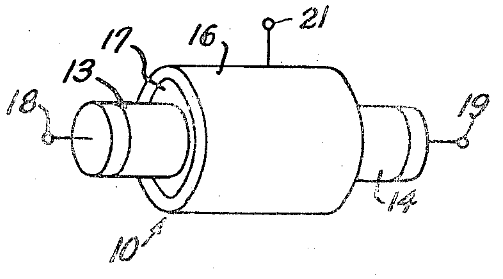
FIG. 6 is an enlarged perspective view of a modification of the invention.

It is also possible to form the semiconductor device in a cylindrical shape as illustrated in FIG. 6 and form the *p* and *n*-type regions 13 and 14 on opposite ends of cylindrical semiconductor 12 and to mount the field effect electrode 16 around the whole peripheral portion of the semiconductor 12 between the regions 13 and 14. In this structure a magnetic field may be applied in any direction at a right angle to the axial direction of the cylindrical semiconductor 12.

Figure 7:
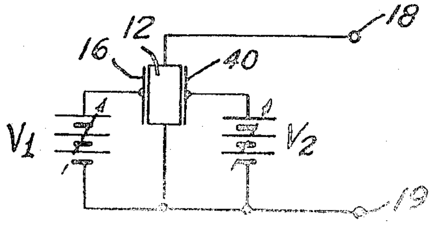
FIG. 7 is a wiring diagram illustrating a further modification of the invention.

FIG. 7 illustrates a modification in which a pair of field effect electrodes 16 and 40 are mounted on opposite sides of the semiconductor 12 and voltage sources $V_1$ and $V_2$ apply different voltages to electrodes 16 and 40 respectively.

In this embodiment, if voltages of opposite polarity and with equal absolute value are applied to the electrodes 16 and 40, there will be no change in the electrical characteristic when no magnetic field is applied. However, when a magnetic field is applied, a change in the characteristic will be twice as much as where there is only one electrode 16, rather than the two electrodes 16 and 40.

It is also possible to modify the surface recombination velocities by making the surface of the semiconductor rough which has no field effect electrode or by changing the shape of this surface, or by diffusing a substance which controls recombination.

Although the invention has been treated as a device with magnetic sensitivity, the response may be varied by the voltage applied to the field effect electrode 16, as shown in FIG. 4.

Although minor modifications might be suggested by those versed in the art, it should be understood that I wish to embody within the scope of the patent warranted hereon all such modifications as reasonably and properly come within the scope of my contribution to the art.

I claim:

1. A semiconductor device comprising a region of *n*-type semiconductor material, a region of *p*-type semiconductor material, and an intermediate region of semiconductor material between said *p*- and *n*-type regions having less carrier concentration than either said *p*-type region or said *n*-type region first biasing means connected to said *p*- and *n*-type regions for injecting carriers into said intermediate region and for causing carriers to flow between said *p*- and *n*-type regions, a field effect electrode insulatingly mounted on a surface of said intermediate region, said surface of said intermediate region adjacent said field effect electrode formed of *p*-type or *n*-type material second biasing means connected to said field effect electrode for controlling the surface recombination velocity said semiconductor device being subjected to a magnetic field to control the deflection of carriers between said intermediate region and said surface as functions of the intensity and direction of said magnetic field and the bias on said field effect electrode, and thereby to alter the flow of carriers between said *p*- and *n*-type regions.

2. A semiconductor device according to claim 1 wherein said surface of said intermediate region adjacent said field effect electrode is formed of *p*-type material.

3. A semiconductor device according to claim 1 wherein said surface of said intermediate region adjacent said field effect electrode is formed of *n*-type material.

4. A magnetic field detecting device comprising a semiconductor device having a region of *p*-type semiconductor material, a region of *n*-type semiconductor material, and an intermediate region of semiconductor material between said *p*- and *n*-type regions having less carrier concentration than either said *p*-type region or said *n*-type region, first biasing means connected to said *p*- and *n*-type regions for injecting carriers into said intermediate region and for causing carriers to flow between said *p*- and *n*-type regions, a field effect electrode insulatingly mounted on a surface of said intermediate region, said surface of said intermediate region formed of semiconductor material of *p*- or *n*-type, second biasing means connected to said field effect electrode for controlling the surface recombination velocity of said intermediate region, whereby the flow of carriers through said semiconductor device is responsive to a magnetic field as a function of intensity and direction of the magnetic field and said flow of carriers is further influenced by said bias on said field effect electrode.

5. A magnetic field detecting device according to claim 4 wherein said surface of said intermediate region is formed of *p*-type material.

6. A magnetic field detecting device according to claim 4 wherein said surface of said intermediate region is formed of *n*-type material.

7. A semiconductor circuit comprising a pair of magnetoresistance elements connected in circuit together, each of said magnetoresistance elements comprising, semiconductor material of substantially intrinsic conductance, a *p*-type and *n*-type region separately formed on said semiconductor material and injecting carriers into said semiconductor material, and at least one control electrode mounted adjacent said semiconductor material between said *p*-type and *n*-type regions to control the recombination velocity at the surface of said semiconductor material, an insulating layer on the semiconductor material under the control electrode, and including means for producing a magnetic field which traverses the semiconductor material to cause variations of resistance between the *p*- and *n*-type regions, and the means for producing a magnetic field in each element arranged so that the carriers, hole and electrons in one magnetoresistance element move toward the control electrode and the carriers, holes and electrons in the other magnetoresistance element move away from its control electrode.

8. A semiconductor circuit according to claim 7 where in the magnetoresistance elements are connected in series, a bias voltage source connected across the magnetoresistance elements, and a pair of control voltage sources connected respectively to the control electrodes of the magnetoresistance elements.

9. A semiconductor device according to claim 8 including a pair of output terminals connected to the magnetoresistance elements.